United States Patent [19]
Okada et al.

[11] Patent Number: 5,786,403
[45] Date of Patent: Jul. 28, 1998

[54] FOAMABLE OLEFIN THERMOPLASTIC ELASTOMER COMPOSITIONS AND FOAMED PRODUCTS THEREOF

[75] Inventors: Keiji Okada; Hiroyasu Yamaoka; Akira Uchiyama, all of Ichihara, Japan

[73] Assignee: Mitsui Petrochemical Industries, Ltd., Tokyo, Japan

[21] Appl. No.: 807,984

[22] Filed: Mar. 3, 1997

[30] Foreign Application Priority Data

Mar. 4, 1996 [JP] Japan .................................. 8-046265

[51] Int. Cl.$^6$ .................................. C08J 9/08; C08J 9/10
[52] U.S. Cl. .................................. 521/134; 521/92; 521/97; 521/139; 521/140; 525/232; 525/240
[58] Field of Search .................................. 521/140, 139, 521/134

[56] References Cited

U.S. PATENT DOCUMENTS 4,212,787  7/1980  Matsuda et al. .................. 521/140

*Primary Examiner*—Morton Foelak
*Attorney, Agent, or Firm*—Sherman and Shalloway

[57] ABSTRACT

Disclosed is a foamable olefin thermoplastic elastomer composition comprising (A) a partially crosslinked thermoplastic elastomer composition, (B) long-chain branch-containing polypropylene and (C) a foaming agent. The partially crosslinked thermoplastic elastomer composition (A) is obtained by dynamically heat-treating a mixture in the presence of organic peroxide, said mixture comprising specific proportions of a peroxide-crosslinking type olefin copolymer rubber (a), which is an ethylene/α-olefin copolymer rubber composed of ethylene, an α-olefin of 3 to 20 carbon atoms and optionally a nonconjugated diene, and a peroxide-decomposition type olefin plastic (b), which is an α-olefin (co)polymer containing a specific amount of an α-olefin of 3 to 20 carbon atoms and having a specific MFR. Also disclosed is a foamed product obtained by heating the foamable olefin thermoplastic elastomer composition. From the foamable olefin thermoplastic elastomer composition, a foamed product having an expansion ratio of at least 2 times, being free from surface roughening caused by defoaming, being soft to the touch and showing excellent heat resistance and weathering resistance can be produced with high productivity through simplified steps.

9 Claims, 2 Drawing Sheets

1

FOAMABLE OLEFIN THERMOPLASTIC ELASTOMER COMPOSITIONS AND FOAMED PRODUCTS THEREOF

FIELD OF THE INVENTION

The present invention relates to foamable olefin thermoplastic elastomer compositions capable of providing foamed products which are soft to the touch and have excellent heat resistance, and also relates to foamed products of the compositions.

BACKGROUND OF THE INVENTION

As a process for preparing elastomer (vulcanized rubber) foamed products, there has been known a process comprising the steps of kneading a natural or synthetic rubber with a vulcanizing agent and a foaming agent, molding the kneadate into a product of given shape and heating the molded product to thereby foam the molded product.

According to this process, however, if the rubber is molded into a product of given shape by means of continuous extrusion, the step of batchwise kneading the rubber with the compounding ingredients to obtain a kneadate must be carried out prior to the continuous extrusion. Further, in order to facilitate feeding of the kneadate to the extruder, the step of molding the kneadate into a ribbon shape must be carried out prior to the continuous extrusion. Thus, the above process has complicated steps, and besides the vulcanization-foaming step needs a fairly long period of time, resulting in disadvantages in the industrial production.

In order to solve these problems, a process of using flexible olefin plastics, e.g., thermoplastic resins such as ethylene/vinyl acetate copolymer and low-density polyethylene, has been known. According to the process of using flexible olefin plastics, the above-mentioned steps are omissible.

However, the flexible olefin plastics are inherently inferior to rubbers in the heat resistance, and therefore the resulting foamed products are greatly restricted in their uses.

Meanwhile, it is known that partially crosslinked compositions comprising olefin copolymer rubbers and olefin plastics show intermediate properties between the flexible olefin plastics and the vulcanized rubbers and that they are employable as the thermoplastic elastomers, as described in, for example, Japanese Patent Laid-Open Publications No. 26838/1973 and No. 112967/1979.

However, the olefin plastic components of the thermoplastic elastomers proposed in the above publications are decomposed when the elastomers are dynamically heat-treated in the presence of peroxide, so that the elastomers show poor tension in the melting stage. Consequently, these thermoplastic elastomers are easily defoamed in the foam molding stage. Even if a foamed product is obtained, it has an expansion ratio of at most about 1.5 times and suffers marked surface roughening caused by the defoaming.

Accordingly, there is desired development of a foamable olefin thermoplastic elastomer composition from which a foamed product having an expansion ratio of at least 2 times, being free from surface roughening caused by defoaming, being soft to the touch and showing excellent heat resistance can be produced with high productivity through simplified steps. Also desired is development of a foamed product of the foamable olefin thermoplastic elastomer composition.

OBJECT OF THE INVENTION

The present invention is intended to solve such problems associated with the prior art as described above, and it is an object of the invention to provide a foamable olefin thermoplastic elastomer composition from which a foamed product having an expansion ratio of at least 2 times, being free from surface roughening caused by defoaming, being soft to the touch and showing excellent heat resistance can be produced with high productivity through simplified steps. It is another object of the invention to provide a foamed product of the composition.

SUMMARY OF THE INVENTION

The foamable olefin thermoplastic elastomer composition according to the invention comprises:

[I] 83 to 99 parts by weight of a partially crosslinked thermoplastic elastomer composition (A) obtained by dynamically heat-treating a mixture in the presence of organic peroxide, said mixture comprising:

60 to 95 parts by weight of a peroxide-crosslinking type olefin copolymer rubber (a) which is an ethylene/α-olefin copolymer rubber comprising ethylene, an α-olefin of 3 to 20 carbon atoms and optionally a nonconjugated diene, and 5 to 40 parts by weight of a peroxide-decomposition type olefin plastic (b) which is an α-olefin homopolymer or copolymer containing 50 to 100% by mol of an α-olefin of 3 to 20 carbon atoms and having a melt flow rate (ASTM D 1238-65T, 230° C., load of 2.16 kg) of 5 to 80 g/10 min, the total amount of said components (a) and (b) being 100 parts by weight,

[II] 1 to 17 parts by weight of long-chain branch-containing polypropylene (B), and

[III] a foaming agent (C), the total amount of said components (A) and (B) being 100 parts by weight.

The α-olefin for constituting the ethylene/α-olefin copolymer rubber, which is the peroxide-crosslinking type olefin copolymer rubber (a), is preferably propylene or 1-butene.

The peroxide-decomposition type olefin plastic (b) is preferably an isotactic polypropylene or a propylene/α-olefin copolymer.

The thermoplastic elastomer composition (A) is preferably a thermoplastic elastomer composition having been dynamically heat-treated in the presence of organic peroxide and divinylbenzene so as to be partially crosslinked.

The long-chain branch-containing polypropylene (B) has a Z average molecular weight (Mz) of at least $1.0 \times 10^6$, contains a long-chain branched polymer and has a molecular weight distribution (Mz/Mw) of at least 3.0.

The content of the foaming agent (C) in the foamable olefin thermoplastic elastomer composition is usually 0.5 to 20 parts by weight based on 100 parts by weight of the total amount of the thermoplastic elastomer composition (A) and the long-chain branch-containing polypropylene (B).

The olefin thermoplastic elastomer foamed product according to the invention is a foamed product obtained by heating the foamable olefin thermoplastic elastomer composition of the invention.

The olefin thermoplastic elastomer foamed product preferably has an expansion ratio of not less than 2 times.

DETAILED DESCRIPTION OF THE INVENTION

Figure 1:
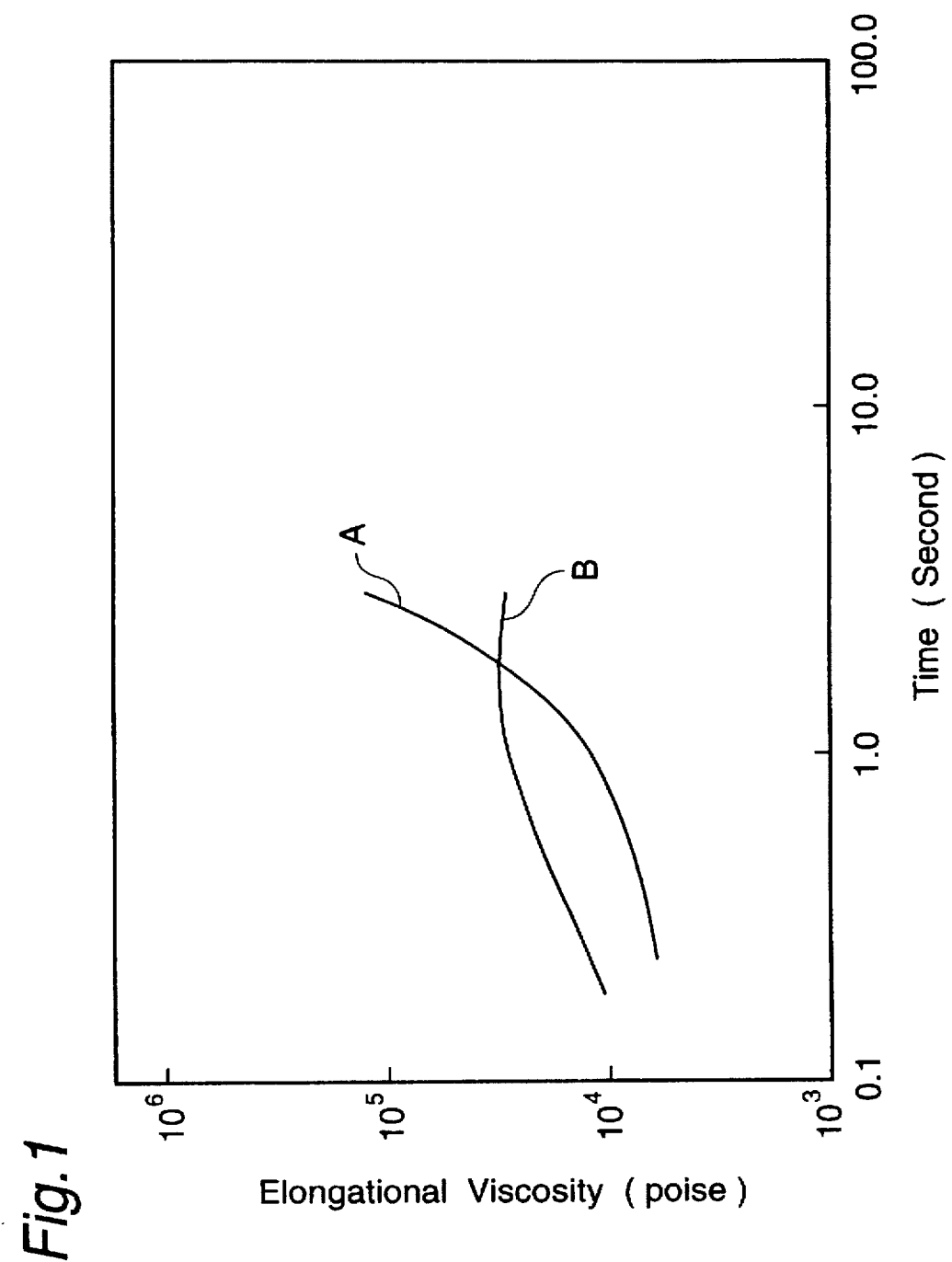
FIG. 1 graphically shows a relation between elongational viscosity and time at a strain rate of a polypropylene resin having a long-chain branch or a polypropylene resin having no long-chain branch.

The foamable olefin thermoplastic elastomer composition and the foamed product of the composition according to the invention are described in detail hereinafter.

First, the foamable olefin thermoplastic elastomer composition is described.

The foamable olefin thermoplastic elastomer composition of the invention comprises a specific partially crosslinked thermoplastic elastomer composition (A), specific long-chain branch-containing polypropylene (B) and a foaming agent (C).

Thermoplastic Elastomer Composition (A)

The thermoplastic elastomer composition (A) used in the invention is a thermoplastic elastomer composition partially crosslinked (also referred to as "partially crosslinked thermoplastic elastomer composition") and is obtained by dynamically heat-treating a mixture containing specific proportions of a peroxide-crosslinking type olefin copolymer rubber (a) and a peroxide-decomposition type olefin plastic (b).

The partially crosslinked thermoplastic elastomer composition means a thermoplastic elastomer composition wherein there are present together a component obtained by the increase of the molecular weight of the polymer resulting from predominance of the crosslinking reaction in the competitive reactions of the decomposition reaction and the crosslinking reaction, said competitive reactions occurring when the olefin thermoplastic elastomer is reacted with peroxide under heating, and a component obtained by the decrease of the molecular weight of the polymer resulting from predominance of the decomposition reaction in such competitive reactions.

Peroxide-crosslinking Type Olefin Copolymer Rubber (a)

The peroxide-crosslinking type olefin copolymer rubber (a) used in the invention is an amorphous, random, elastomeric copolymer composed of ethylene and an α-olefin of 3 to 20 carbon atoms or an amorphous, random, elastomeric copolymer composed of ethylene, an α-olefin of 3 to 20 carbon atoms and a nonconjugated diene, and is an olefin copolymer rubber which is crosslinked when kneaded under heating to thereby have lowered flowability or no flowability.

The peroxide-crosslinking type olefin copolymer rubber has an ethylene content of not less than 50% by mol, and examples thereof include:

(1) an ethylene/α-olefin copolymer rubber [ethylene/α-olefin (by mol)=about 90/10 to 50/50], and (2) an ethylene/α-olefin/nonconjugated diene copolymer rubber [ethylene/α-olefin (by mol)=about 90/10 to 50/50].

Examples of the nonconjugated dienes include dicyclopentadiene, 1,4-hexadiene, cyclooctadiene, methylene norbornene and ethylidene norbornene. Of the above copolymer rubbers, preferable are an ethylene/propylene copolymer rubber, an ethylene/propylene/nonconjugated diene copolymer rubber, an ethylene/1-butene copolymer rubber and an ethylene/1-butene/nonconjugated diene copolymer rubber. Among them, an ethylene/propylene/nonconjugated diene copolymer rubber is preferable. Particularly, an ethylene/propylene/ethylidene norbornene copolymer rubber is preferable because a thermoplastic elastomer foamed product having a moderate crosslinked structure can be obtained by the use of this copolymer rubber.

The peroxide-crosslinking type olefin copolymer rubber (a) preferably has a Mooney viscosity $[ML_{1+4} (100° C.)]$ of 10 to 250, particularly 30 to 150.

The olefin copolymer rubber (a) preferably has an iodine value of not more than 25. When the olefin copolymer rubber (a) has an iodine value in this range, a thermoplastic elastomer composition (A), which is partially crosslinked with good balance, can be obtained.

The peroxide-crosslinking type olefin copolymer rubber (a) is used in an amount of 60 to 95 parts by weight, preferably 70 to 90 parts by weight, based on 100 parts by weight of the total amount of the peroxide-crosslinking type olefin copolymer rubber (a) and the peroxide-decomposition type olefin plastic (b).

In the present invention, the peroxide-crosslinking type olefin copolymer rubber (a) can be used in combination with other rubbers than this olefin copolymer rubber (a), within limits not prejudicial to the objects of the invention. Examples of the other rubbers include diene rubbers, such as styrene/butadiene rubber (SBR), nitrile rubber (NBR) and natural rubber (NR), and silicone rubbers.

Peroxide-decomposition Type Olefin Plastic (b)

The peroxide-decomposition type olefin plastic (b) used in the invention is a homopolymer or copolymer containing 50 to 100% by mol of an α-olefin of 3 to 20 carbon atoms and has such properties that it is thermally decomposed so as to be decreased in the molecular weight when mixed with peroxide and kneaded under heating, to thereby enhance flowability of the resin.

Examples of the peroxide-decomposition type olefin plastics (b) include homopolymers and copolymers, such as:

(1) a propylene homopolymer, (2) a random copolymer of propylene and not more than 10% by mol of other α-olefin, (3) a block copolymer of propylene and not more than 30% by mol of other α-olefin, (4) a 1-butene homopolymer, (5) a random copolymer of 1-butene and not more than 10% by mol of other α-olefin, (6) a 4-methyl-1-pentene homopolymer, and (7) a random copolymer of 4-methyl-1-pentene and not more than 20% by mol of other α-olefin.

Examples of the α-olefins include ethylene, propylene, 1-butene, 4-methyl-1-pentene, 1-hexene and 1-octene. Of the above olefin plastics (b), preferable are the propylene homopolymer and a propylene/α-olefin copolymer having a propylene content of not less than 50% by mol. Above all, an isotactic polypropylene and a propylene/α-olefin copolymer, e.g., a propylene/ethylene copolymer, a propylene/1-butene copolymer, a propylene/1-hexene copolymer and a propylene/4-methyl-1-pentene copolymer, are preferable.

The peroxide-decomposition type olefin plastic (b) preferably has a melt flow rate (ASTM D 1238-65T, 230° C., load of 2.16 kg) of 5 to 80 g/10 min, particularly 5 to 20 g/10 min.

In the present invention, the peroxide-decomposition type olefin plastic (b) has a function of improving flowability and heat resistance of the resulting composition.

The peroxide-decomposition type olefin plastic (b) is used in an amount of 5 to 40 parts by weight, preferably 10 to 30 parts by weight, based on 100 parts by weight of the total amount of the peroxide-crosslinking type olefin copolymer rubber (a) and the peroxide-decomposition type olefin plastic (b). When the peroxide-decomposition type olefin plastic (b) is used in this amount, a foamable thermoplastic elastomer composition having good flowability and capable of providing a foamed product of excellent flexibility can be obtained.

Other Components

The thermoplastic elastomer composition (A) used in the invention may further contain a peroxide-noncrosslinking type rubber-like material (c) in addition to the peroxide-crosslinking type olefin copolymer rubber (a) and the peroxide-decomposition type olefin plastic (b).

The peroxide-noncrosslinking type rubber-like material (c) is a hydrocarbon type rubber-like material which is not crosslinked and not decreased in the flowability even when it is mixed with peroxide and kneaded under heating. Examples of such materials include polyisobutylene, a butyl rubber (IIR), and a propylene/ethylene copolymer rubber and a propylene/1-butene copolymer rubber each of which has a propylene content of not less than 70% by mol. Of these, polyisobutylene and a butyl rubber are preferable from the viewpoints of performance and handling properties. Particularly, polyisobutylene and a butyl rubber each having a Mooney viscosity [$ML_{1+4}$ (100° C.)] of not more than 60 are preferable because they can improve flowability of the resulting composition.

In the present invention, the term "crosslinking" means a phenomenon that in the competitive reactions of the decomposition reaction and the crosslinking reaction occurring when the polymer is reacted with peroxide under heating, the crosslinking reaction predominates, whereby the apparent molecular weight of the polymer in the composition increases. The term "decomposition" means a phenomenon that the decomposition reaction predominates, whereby the apparent molecular weight of the polymer decreases.

The peroxide-noncrosslinking type rubber-like material (c) is optionally used in an amount of 5 to 100 parts by weight, preferably 5 to 30 parts by weight, based on 100 parts by weight of the total amount of the peroxide-crosslinking type olefin copolymer rubber (a) and the peroxide-decomposition type olefin plastic (b).

The thermoplastic elastomer composition (A) used in the invention may further contain a mineral oil type softener (d) in addition to the peroxide-crosslinking type olefin copolymer rubber (a), the peroxide-decomposition type olefin plastic (b) and the peroxide-noncrosslinking type rubber-like material (c).

Examples of the mineral oil type softeners (d) include high-boiling petroleum fractions, which are conventionally used for the purpose of lowering the intermolecular force of rubbers in the rubber rolling process to thereby facilitate the rolling, assisting dispersion of carbon black or white carbon, or decreasing hardness of vulcanized rubbers to increase flexibility. The petroleum fractions are classified into paraffinic type, naphthene type, aromatic type, etc.

Particular examples of the mineral type softeners (d) include process oil, paraffin, liquid paraffin, white oil, petrolatum, petroleum sulfonic acid salt, petroleum asphalt, gilsonite, mineral rubber and petroleum resin.

The mineral oil type softener (d) is used in an amount of 5 to 100 parts by weight, preferably 5 to 80 parts by weight, more preferably 20 to 40 parts by weight, based on 100 parts by weight of the total amount of the peroxide-crosslinking type olefin copolymer rubber (a) and the peroxide-decomposition type olefin plastic (b). When the mineral oil type softener (d) is used in this amount, the flowability of the foamable thermoplastic elastomer composition can be sufficiently improved without lowering heat resistance and tensile properties of the foamed product of the composition.

In the present invention, other softeners than the mineral oil type softener (d) can be optionally employed within limits not prejudicial to the objects of the invention. As the optionally employable softeners other than the mineral oil type softener (d), those conventionally used for rubbers are suitable. Examples of such softeners include:

coal tars, such as coal tar and coal tar pitch;

fatty oils, such as castor oil, linseed oil, rapeseed oil, soybean oil and coconut oil;

waxes, such as tall oil, beeswax, carnauba wax and lanolin;

fatty acids, such as ricinolic acid, palmitic acid, stearic acid, 12-hydroxystearic acid, montanic acid, oleic acid and erucic acid, or metallic salts of these acids;

ester plasticizers, such as dioctyl phthalate, dioctyl adipate and dioctyl sebacate; and other softeners, such as microcrystalline wax, liquid polybutadiene or its modified or hydrogenated product and liquid thiokol.

Further, to the partially crosslinked thermoplastic elastomer composition (A) used for the invention, various known additives, such as heat stabilizer, weathering stabilizer, anti-aging agent, antistatic agent, filler, colorant and lubricant, can be optionally added within limits not prejudicial to the objects of the invention.

Process for Preparing Partially Crosslinked Thermoplastic Elastomer Composition (A)

The partially crosslinked thermoplastic elastomer composition (A) used in the invention can be obtained by dynamically heat-treating a mixture of the peroxide-crosslinking type olefin copolymer rubber (a), the peroxide-decomposition type olefin plastic (b), and if desired, the peroxide-noncrosslinking type rubber-like material (c), the mineral oil type softener (d), etc., in the presence of organic peroxide.

Examples of the organic peroxides include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane and n-butyl-4,4-bis(tert-butylperoxy)valerate are preferable from the viewpoints of odor and scorch stability. Among them, most preferable is 1,3-bis(tert-butylperoxyisopropyl)benzene.

The organic peroxide is used in an amount of 0.05 to 3% by weight, preferably 0.1 to 2% by weight, based on 100% by weight of the total amount of the peroxide-crosslinking type olefin copolymer rubber (a) and the peroxide-decomposition type olefin plastic (b).

In the partial crosslinking treatment with the organic peroxide, there can be added an optional component, for example, peroxy crosslinking assistants, such as sulfur, p-quinone dioxime, p,p'-dibenzoylquinone dioxime, N-methyl-N-4-dinitrosoaniline, nitrosobenzene, diphenylguanidine and trimethylolpropnane-N,N'-m-phenylenedimaleimide; divinylbenzene; triallyl cyanurate; polyfunctional methacrylate monomers, such as ethylene glycol dimethacrylate, diethylene glycol dimethacrylate, polyethylene glycol dimethacrylate, trimethylolpropane trimethacrylate and allyl methacrylate; and polyfunctional vinyl monomers, such as vinyl butyrate and vinyl stearate.

By the use of the above optional component, uniform and mild crosslinking reaction can be expected. Of the above compounds exemplified as the optional component, divinylbenzene (DVB) is most preferably used in the invention. Divinylbenzene can be easily handled and is compatible with the peroxide-crosslinking type olefin copolymer rubber (a) and the peroxide-decomposition type olefin plastic (b), which are major components of the object of the crosslinking treatment. Moreover, divinylbenzene has a function of solubilizing the organic peroxide and serves as a dispersant of the organic peroxide. Therefore, a partially crosslinked thermoplastic elastomer composition (A), which exerts homogeneous crosslinking effects when heat-treated and which is well-balanced between flowability and other properties, can be obtained.

In the present invention, the above optional component, such as the crosslinking assistant or the polyfunctional vinyl monomer, is preferably used in an amount of 0.1 to 3% by weight, particularly 0.3 to 2% by weight, based on 100% by weight of the total amount of the peroxide-crosslinking type olefin copolymer rubber (a) and the peroxide-decomposition type olefin plastic (b). When the optional component, such as the crosslinking assistant or the polyfunctional vinyl monomer, is used in this proportion, the optional component does not remain as the unreacted monomer in the resulting partially crosslinked thermoplastic elastomer composition (A), so that the composition is free from a change of properties caused by heat history in the molding process and shows excellent flowability.

By the term "dynamically heat treating" is meant that the components are kneaded in a molten state.

The dynamic heat treatment is carried out by means of various kneading apparatuses such as a mixing roll of open type, Banbury mixer, a kneader, a single-screw or twin-screw extruder and a continuous mixer of closed type, but the treatment is preferably carried out by means of closed type kneading apparatuses. Further, the dynamic heat treatment is preferably conducted in an atmosphere of inert gas such as nitrogen or carbon dioxide gas.

The kneading is desirably conducted at a temperature at which the half-life period of the organic peroxide used is less than 1 minute. The kneading temperature is usually 150° to 280° C., preferably 170° to 240° C., and the kneading time is 1 to 20 minutes, preferably 1 to 5 minutes. The shear force applied in the kneading process is determined in the shear rate of usually 10 to $10^4$ sec$^{-1}$.

In the present invention, it is desired to mix and knead the above components in the following manner. That is, the peroxide-crosslinking type olefin copolymer rubber (a), the peroxide-decomposition type olefin plastic (b), and optionally, the peroxide-noncrosslinking type rubber-like material (c), the mineral oil type softener (d), etc. are mixed previously, uniformly kneaded and pelletized. Then, the pellets, a solution of organic peroxide in divinylbenzene, and optionally, a crosslinking assistant, a vulcanization accelerator, etc. are uniformly mixed at a temperature of preferably not higher than 50° C. by means of a known kneading machine such as a tumbling brabender, a V-brabender or a Henschel mixer. Thereafter, the mixture is kneaded under the aforementioned given conditions.

Through the above process, the thermoplastic elastomer composition (A) wherein the peroxide-crosslinking type olefin copolymer rubber (a) is partially crosslinked is obtained.

By the term "partially crosslinked thermoplastic elastomer composition" used herein is meant that the composition has a gel content, as measured by the below-described method, of not less than 10% by weight, preferably 20 to 97% by weight, particularly preferably 30 to 97% by weight.

Measurement of Gel Content

A sample of a thermoplastic elastomer composition of about 100 g is cut into fine fragments (size: 0.5 mm×0.5 mm×0.5 mm). In a closed vessel, the sample is immersed in 30 ml of cyclohexane at 23° C. for 48 hours.

Then, the sample is taken out, placed on a filter paper and dried at room temperature for not less than 72 hours until a constant weight is reached.

From the weight of the dry residue, the weight of all the cyclohexane-insoluble components (e.g., fibrous filler, filler, pigment) other than the polymer component is subtracted. The obtained value is taken as "corrected final weight (Y)".

On the other hand, from the sample weight, the weight of the cyclohexane-soluble components (e.g., softener) other than the polymer component and the weight of the cyclohexane-insoluble components (e.g., fibrous filler, filler, pigment) are subtracted. The obtained value is taken as "corrected initial weight (X)".

The gel content (content of the cyclohexane-insoluble components) is calculated by the following equation.

*Gel content [wt. %]=[corrected final weight (Y)/corrected initial weight (X)]×100*

In the present invention, the thermoplastic elastomer composition (A) is used in an amount of 83 to 99 parts by weight, preferably 91 to 99 parts by weight, based on 100 parts by weight of the total amount of the thermoplastic elastomer composition (A) and the long-chain branch-containing polypropylene (B). When the thermoplastic elastomer composition (A) is used in this amount, a thermoplastic elastomer composition capable of producing a foamed product having excellent flexibility and high expansion ratio can be obtained.

Long-chain Branch-containing Polypropylene (B)

The long-chain branch-containing polypropylene (B) used in the invention is a homopolymer of propylene or a copolymer of propylene and an α-olefin of 2 to 20 carbon atoms. Examples of the long-chain branch-containing polypropylenes (B) include:

(1) a propylene homopolymer, (2) a random copolymer of propylene and not more than 10% by mol of other α-olefin, and (3) a block copolymer of propylene and not more than 30% by mol of other α-olefin.

Examples of the α-olefins include ethylene, 1-butene, 4-methyl-1-pentene, 1-hexene and 1-octene.

These long-chain branch-containing polypropylenes (B) can be used singly or in combination.

The long-chain branch-containing polypropylene (B) for use in the invention has a Z average molecular weight (Mz) of at least $1.0 \times 10^6$, contains a long-chain branched polymer and has a molecular weight distribution (Mz/Mw) of at least 3.0. In the invention, preferably used is polypropylene which shows multimodal molecular weight distribution having at least one low molecular weight region and at least one high molecular weight region, e.g., bimodal molecular weight distribution, and contains a long-chain branched polymer in the high molecular weight region. Particularly preferable is polypropylene having a Z average molecular weight (Mz) of at least $2.0 \times 10^6$.

The long-chain branch-containing polypropylene (B) used in the invention can be prepared by, for example, a process described in U.S. Pat. No. 4,916,198. One example of the polypropylene (B) is long-chain branch-containing polypropylene commercially available from Himont Co.

Whether a polypropylene resin has a long-chain branch or not can be ascertained in the following manner.

A test sample is prepared from a polypropylene resin, and the relation between elongational viscosity (poise) and time (sec.) at the strain rate ($sec^{-1}$) of the sample is graphically expressed by the use of an extensional fluidity measuring device (e.g., RER-9000 extensional rheometer of Rheometrics Co.). In this graph, the propylene resin having a long-chain branch can be distinguished from the propylene resin having no long-chain branch by that a slope of the elongational viscosity curve becomes larger with time or becomes smaller with time. The polypropylene resin having a long-chain branch shows an elongational viscosity curve having a larger slope with time, while the polypropylene resin having no long-chain branch shows an elongational viscosity curve having a smaller slope with time. FIG. 1 is a graph showing a relation between elongational viscosity and time at the strain rate of the polypropylene resin having a long-chain branch or the polypropylene resin having no long-chain branch, said graph being obtained from the results of the measurement using RER-9000 extensional rheometer of Rheometrics Co. In this graph, the resin having a long-chain branch is represented by a curve A, and the resin having no long-chain branch is represented by a curve B. From this graph, it has been confirmed that the polypropylene resin having a long-chain branch shows an elongational viscosity curve having a larger slope with time, while the polypropylene resin having no long-chain branch shows an elongational viscosity curve having a smaller slope with time. The sample used in the measurement and the measuring conditions are as follows.

Shape and size of the sample: column-like shape, 30 mm in length, 5 mm in diameter Strain rate: $1.0 \ sec^{-1}$ Measuring temperature: melting point of the base resin+ 20° C. (The melting point of the base resin is a temperature at the maximum peak among the endothermic peaks of a DSC curve obtained by heating 1 to 5 mg of the base resin at a heat-up rate of 10° C./min by means of a differential scanning calorimeter.)

When the long-chain branch-containing polypropylene (B) is used, a foamable thermoplastic elastomer composition having improved melt tension and capable of producing a foamed product of high expansion ratio can be obtained.

The long-chain branch-containing polypropylene (B) used in the invention has a melt flow rate (MFR, ASTM D 1238, 230° C., load of 2.16 kg) of usually 0.01 to 40 g/10 min, preferably 0.1 to 40 g/10 min, more preferably 0.1 to 30 g/10 min.

In the present invention, the long-chain branch-containing polypropylene (B) is used in an amount of 1 to 17 parts by weight, preferably 1 to 9 parts by weight, based on 100 parts by weight of the total amount of the thermoplastic elastomer composition (A) and the long-chain branch-containing polypropylene (B). When the long-chain branch-containing polypropylene (B) is used in this amount, a thermoplastic elastomer composition capable of producing a foamed product having excellent flexibility and high expansion ratio can be obtained.

The present invention is characterized in that the long-chain branch-containing polypropylene (B) is added after the partially crosslinked thermoplastic elastomer composition (A) is prepared. If the long-chain branch-containing polypropylene (B) is added to the components (e.g., peroxide-crosslinking type olefin copolymer rubber (a)) for forming the partially crosslinked elastomer composition (A), then mixed with peroxide and kneaded under heating, the long-chain branch polypropylene (B) may be thermally decomposed so as to be decreased in the molecular weight, though it depends on the kind of the olefin plastic (B) used, and as a result a foamable thermoplastic elastomer composition capable of producing an aimed foamed product cannot be obtained.

Foaming Agent (C)

As the foaming agent (C), organic or inorganic thermal decomposition type foaming agents, water, solvents of hydrocarbon type and flon type, gases such as nitrogen, carbon dioxide, propane and butane, etc. are employable. Of these, the thermal decomposition type foaming agents are preferable.

Examples of the thermal decomposition type foaming agents include:

inorganic foaming agents, such as sodium hydrogencarbonate, sodium carbonate, ammonium hydrogencarbonate, ammonium carbonate and ammonium nitrite;

nitroso compounds, such as N,N'-dimethyl-N,N'-dinitrosoterephthalamide and N,N'-dinitrosopentamethylenetetramine;

azo compounds, such as azodicarbonamide, azobisisobutyronitrile, azocyclohexylnitrile, azodiaminobenzene and barium azodicarboxylate;

sulfonylhydrazide compounds, such as benzenesulfonylhydrazide, toluenesulfonylhydrazide, p,p'-oxybis(benzenesulfonylhydrazide) and diphenylsulfone-3, 3'-disulfonylhydrazide; and azide compounds, such as calcium azide, 4,4'-diphenyldisulfonylazide and p-toluenesulfonylazide.

The foaming agent (C) is used in an amount of usually 0.5 to 20 parts by weight, preferably 1 to 10 parts by weight, based on 100 parts by weight of the total amount of the partially crosslinked thermoplastic elastomer composition (A) and the long-chain branch polypropylene (B).

If necessary, a foaming assistant may be added. Examples of the foaming assistants include various metal compounds such as zinc, calcium, lead, iron and barium compounds, organic acids such as citric acid, salicylic acid, phthalic acid and stearic acid, and urea or its derivatives. The foaming assistant has functions of decreasing a decomposition temperature of the foaming agent, accelerating decomposition of the foaming agent, producing uniform bubbles, etc.

For the purpose of conducting uniform foaming in a high expansion ratio, an inorganic porous powder which adsorbs inorganic gas (e.g., zeolite) or a resin having high adsorptivity of inorganic gas (e.g., polycarbonate resin) may be further added. Also, a nucleating agent serving in the foaming stage may be added.

Other Components

To the foamable thermoplastic elastomer composition of the invention, various known additives, such as filler, heat stabilizer, anti-aging agent, weathering stabilizer, antistatic agent, metallic soap, lubricant (e.g., wax), pigment, dye, nucleating agent, flame retarder and anti-blocking agent, can be optionally added within limits not prejudicial to the objects of the invention.

As the fillers, those conventionally used for rubbers are suitable. Examples of such fillers include calcium carbonate, calcium silicate, clay, kaolin, talc, silica, diatomaceous earth, mica powder, asbestos, barium sulfate, aluminum sulfate, calcium sulfate, magnesium carbonate, molybdenum disulfide, glass fiber, glass balloon, Shirasu balloon, graphite and alumina.

The filler is used in an amount of not more than 40 parts by weight, preferably 1 to 30 parts by weight, based on 100 parts by weight of the total amount of the partially crosslinked thermoplastic elastomer composition (A) and the long-chain branch-containing polypropylene (B).

Examples of the known heat stabilizers, anti-aging agents and weathering stabilizers optionally used include those of phenol type, sulfite type, phenylalkane type, phosphite type and amine type.

Olefin Thermoplastic Elastomer Foamed Product

The olefin thermoplastic elastomer foamed product according to the invention is a foamed product obtained by heating the above-described foamable olefin thermoplastic elastomer composition of the invention.

In the production of the olefin thermoplastic elastomer foamed product of the invention, first, a mixture comprising the peroxide-crosslinking type olefin copolymer rubber (a) and the peroxide-decomposition type olefin plastic (b) in specific proportions is dynamically heat-treated in the presence of organic peroxide to obtain the partially crosslinked thermoplastic elastomer composition (A). Details of the process for preparing the composition (A) are described hereinbefore.

Then, the partially crosslinked thermoplastic elastomer composition (A) obtained above is blended with the long-chain branch-containing polypropylene (B) and the foaming agent (C) in the aforesaid specific proportions, and if desired, further blended with a foaming assistant, a wetting agent, etc., to prepare the foamable olefin thermoplastic elastomer composition.

The long-chain branch-containing polypropylene (B) and the foaming agent (C) may be added separately. For example, to the partially-crosslinked thermoplastic elastomer composition (A) can be added first the long-chain branch-containing polypropylene (B) and then the foaming agent (C), or those components may be added in the reverse order.

If the long-chain branch-containing polypropylene (B) and/or the foaming agent (C) is added during the preparation of the thermoplastic elastomer composition (A), a foamable olefin thermoplastic elastomer composition capable of producing an aimed foamed product cannot be obtained. If the long-chain branch-containing polypropylene (B) and/or the foaming agent (C) is added during the preparation of the thermoplastic elastomer composition (A), the long-chain branch-containing polypropylene (B) undergoes decomposition or gelation in the dynamic heat treatment, though it depends on the kind of the long-chain branch-containing polypropylene (B). As a result, the melt viscosity of the resulting composition may greatly differ from a melt viscosity necessary to obtain the aimed foamed product, or the foaming agent (C) may be decomposed to cause degassing.

The thermoplastic elastomer composition (A), the long-chain branch-containing polypropylene (B) and the foaming agent (C) can be blended by, for example, a method of kneading pellets of the thermoplastic elastomer composition (A), the long-chain branch-containing polypropylene (B) and the foaming agent (C) by means of a tumbling brabender, a V-brabender, a ribbon blender, Henschel mixer or the like, then if desired, kneading the kneadate by means of a mixing roll of open type or a kneading machine of closed type such as Banbury mixer, an extruder, a kneader or a continuous mixer.

The additives such as weathering stabilizer, heat stabilizer, anti-aging agent and colorant may be added in any of the above stages.

Then, from the above-obtained foamable composition, a foamed product is produced. The foamed product can be produced by various methods which are conventionally used to obtain known foamed products, for example, extrusion molding, press molding, injection molding and calendering.

To obtain the foamed product by means of extrusion molding, for example, the foamable composition is melted in an extruder and then extruded from a die with foaming the foamable composition; or the composition having been foamed in an extruder is extruded from a die. The resin temperature in the extrusion process is preferably 110° to 250° C.

To obtain the foamed product by means of press molding, for example, pellets of the foamable composition are injected into a heated mold of a press molding machine, then melted with or without applying a mold pressure, and then foamed. The temperature of the mold is preferably 110° to 250° C.

To obtain the foamed product by means of injection molding, for example, the foamable composition is melted under heating by an injection molding machine and then injected into a mold so that the composition is foamed at the nozzle tip. The resin temperature in the injection process is preferably 110° to 250° C.

In the foamed product obtained by the above-described foam molding methods, the peroxide-crosslinking type olefin copolymer rubber (a) is partially crosslinked. Therefore, the foamed product is excellent in heat resistance, tensile properties, flexibility, weathering resistance and elastomeric properties such as impact resilience, and besides the foamed product is more suitable for recycling than vulcanized rubbers.

EFFECT OF THE INVENTION

The foamable olefin thermoplastic elastomer composition of the invention is capable of providing a foamed product having an expansion ratio of not less than 2 times, being free from surface roughening caused by defoaming, being soft to the touch and having excellent heat resistance and weathering resistance. Moreover, by the use of the foamable olefin thermoplastic elastomer composition of the invention, a foamed product which exerts the above-mentioned excellent effects can be produced with high productivity through simplified steps.

The olefin thermoplastic elastomer foamed product of the invention is produced from the foamable olefin thermoplastic elastomer composition of the invention, and hence the foamed product has an expansion ratio of not less than 2 times, is free from surface roughening caused by defoaming, is soft to the touch and has excellent heat resistance and weathering resistance.

The olefin thermoplastic elastomer foamed product of the invention can be used for automobile parts such as weatherstrip sponges, body panels, steering wheels and side shields; footwear such as shoe soles and sandals; electrical parts such as electrical wire covering materials, connectors and cap plugs; civil engineering materials such as potable water supply plates and noise control walls; leisure goods such as golf club grips, baseball bat grips, swimming fins and swimming goggles; and miscellaneous goods such as gaskets, water-proof cloths, a garden hoses and belts.

EXAMPLE

The present invention will be further described with reference to the following examples, but it should be construed that the invention is in no way limited to those examples.

The polypropylenes used in the following examples are shown in Table 1.

TABLE 1

| No | PP (B-1) | PP (B-2) | PP (B-3) | PP (B-4) | PP (B-5) |
| --- | --- | --- | --- | --- | --- |
| Propylene homopolymer | | | | | |
| Long-chain branch | present | present | absent | absent | absent |
| (MFR g/10 min) | 2.0 | 4.1 | 0.7 | 1.8 | 4.3 |
| Mn (×10⁶) | 0.078 | 0.071 | 0.098 | 0.077 | 0.063 |
| Mw (×10⁶) | 0.612 | 0.679 | 0.444 | 0.345 | 0.274 |
| Mz (×10⁶) | 2.668 | 2.879 | 1.154 | 0.938 | 0.732 |
| Mw/Mn | 7.86 | 9.52 | 4.51 | 4.46 | 4.33 |
| Mz/Mw | 4.37 | 4.24 | 2.60 | 2.72 | 2.67 |
| Molecular weight distribution | bimodal | bimodal | monomodal | monomodal | monomodal |
| Other components | *1 | *2 | | | |

*1):PF-814 (reference number), available from Himont Co.
*2):x-10005 (reference number), available from Himont Co.

In the following examples, production of foamed products and evaluation of the basic properties of the foamed products were made in the manner described below.

Test method (1) Extrusion molding

A tubular foamed product and a flat foamed product were produced by extrusion molding under the following apparatus conditions.

Molding machine: extruder having a diameter of 40 mm (available from Toshiba Kikai K.K.)

| | |
| --- | --- |
| Maximum temperature of cylinder: | 190° C. |
| Die temperature: | 150° C. |
| Die: | straight die |
| Tubular foamed product: | die/core = 12.5 mm/10.0 mm |
| Flat foamed product: | lengthwise/crosswise = 2 mm/15 mm |
| Take-up rate: | 8 m/min |

(2) Basic properties

The tubular foamed product and the flat foamed product obtained by the above extrusion molding method (1) were each cut into a specimen, and the expansion ratio of the specimen was measured in the following manner. Further, the appearance and touch of the specimen and uniformity of the bubbles were evaluated in the following manner.

(a) Expansion ratio

The density of an unexpanded product is divided by the apparent density of an expanded product (foamed product), and the obtained value is taken as the expansion ratio.

(b) Surface appearance of foamed product (surface texture)

The surface appearance of the foamed product (protrusions and depressions on the surface caused by defoaming) is observed and ranked according to the following five criteria.

5: The surface is almost smooth.

3: Protrusions and depressions are sporadically present on the surface.

1: The surface is markedly roughened because of defoaming.

4: The surface appearance is intermediate between the rank 5 and the rank 3.

2: The surface appearance is intermediate between the rank 3 and the rank 1.

(c) Touch

The tubular foamed product is touched with finger. If the foamed product has a vulcanized rubber sponge-like soft touch, it is ranked as 5. If the foamed product has a resin-like hard touch, it is ranked as 1. If the foamed product has an intermediate touch between the rank 5 and the rank 1, it is ranked as 4, 3 and 2 from that being softer in touch.

(d) Uniformity of bubbles

The cut surface of the foamed product is visually observed, and the foamed product is evaluated based on variations in the sizes and shapes of the bubbles.

If the foamed product has bubbles with extremely uniform sizes and shapes, it is ranked as A. If the foamed product has bubbles with marked variations in the sizes and shapes, e.g., large-sized bubbles formed from some joined bubbles or flat bubbles resulting from degassing, it is ranked as D. If the foamed product has bubbles with intermediate variations between the rank A and the rank D, it is ranked as B or C.

Example 1

75 Parts by weight of an ethylene/propylene/5-ethylidene-2-norbornene copolymer rubber having an ethylene content of 70% by mol, an iodine value of 12 and a Mooney viscosity [ML$_{1+4}$ (100° C.)] of 110 (hereinafter referred to as "EPDM (a)"), 25 parts by weight of polypropylene having a melt flow rate (ASTM D 1238-65T, 230° C., load of 2.16 kg) of 50 g/10 min and a density of 0.91 g/cm³ (hereinafter referred to as "PP-10 (b)"), 30 parts by weight of a butyl rubber having an unsaturation degree of 0.5% and a Mooney viscosity [ML$_{1+4}$ (100° C.)] of 40 (hereinafter referred to as "IIR (c)") and 50 parts by weight of a naphthenic process oil (hereinafter referred to as "oil (d)", trade name: Sunsen 4240, available from Nippon Sun Oil K.K.) were kneaded by a Banbury mixer at 180° C. for 5 minutes in an atmosphere of nitrogen. Then, the kneadate was passed through sheeting rolls, and the resulting sheet was cut with a sheet cutter to prepare pellets.

Subsequently, 180 parts by weight of the pellets and a solution obtained by dissolving 0.3 part by weight of 1,3-bis(tert-butyl-peroxyisopropyl)benzene in 0.5 part by weight of divinylbenzene (DVB) were blended by a tumbling blender to uniformly coat the surfaces of the pellets with the solution.

Then, the pellets were extruded by an extruder at 210° C. in an atmosphere of nitrogen to perform dynamic heat treatment. Thus, a partially crosslinked thermoplastic elastomer composition (A-1) having a gel content of 35% was obtained.

100 Parts by weight of the partially crosslinked thermoplastic elastomer composition (A-1), 5.0 parts by weight of polypropylene [PP (B-1)] shown in Table 1 and 3.0 parts by weight of a mixture (C-1) of 50% by mol of citric acid and 50% by mol of sodium bicarbonate were blended by a tumbling blender. Then, the blend was extrusion molded in accordance with the aforesaid method (1), and the resulting foamed product was evaluated in the aforesaid manner.

Figure 2:
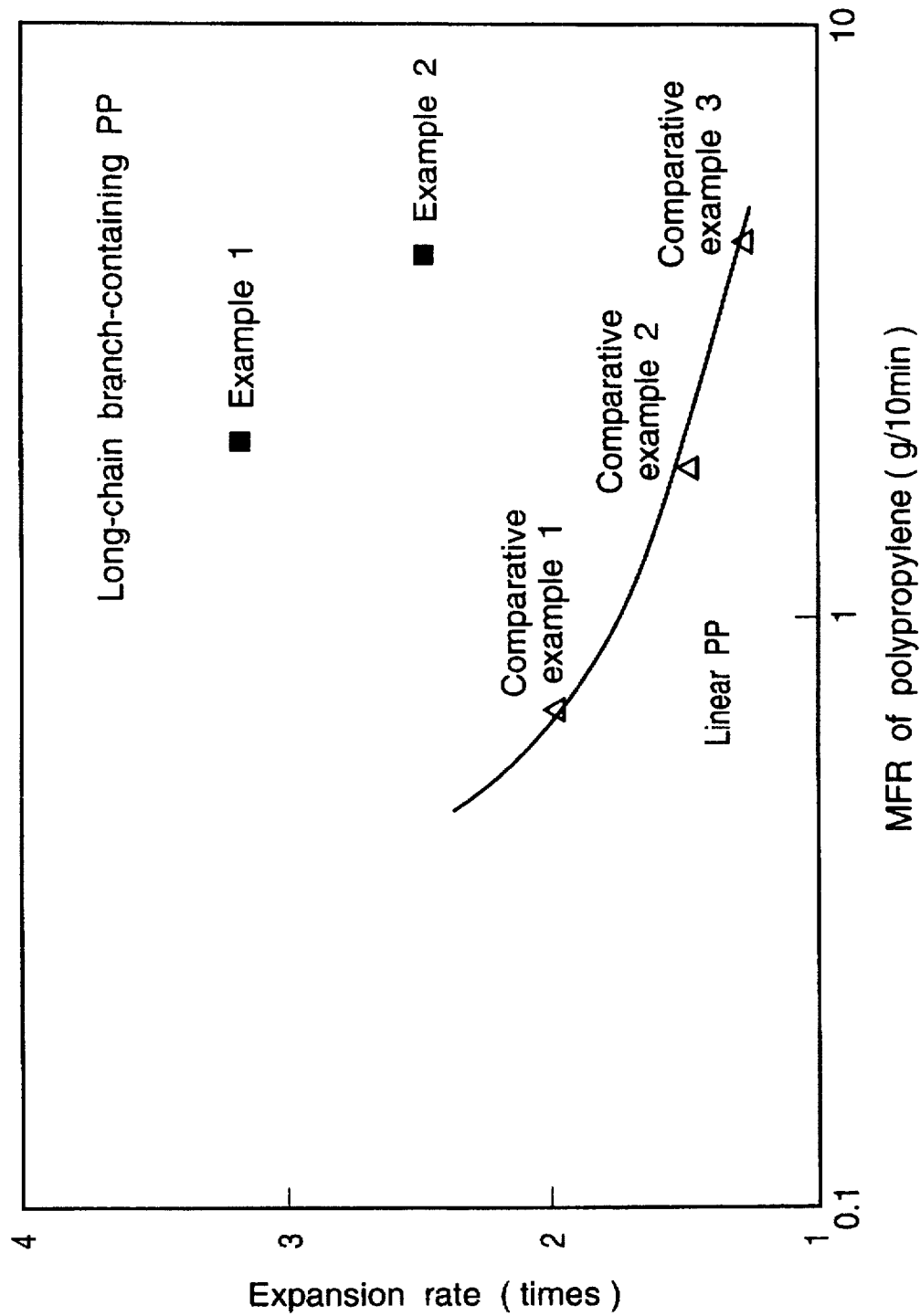
FIG. 2 graphically shows a relation between melt flow rate and expansion ratio of polypropylenes in the invention having a long-chain branch, which are used in Examples 1 and 2, or polypropylenes having no long-chain branch, which are used in Comparative Examples 1 to 3.

The results are set forth in Table 2. The relation between a melt flow rate and an expansion ratio of the long-chain branch-containing polypropylene is shown in FIG. 2.

Example 2

The procedure of Example 1 was repeated except that 5.0 parts by weight of PP (B-2) shown in Table 1 was used in place of PP (B-1).

The results are set forth in Table 2. The relation between a melt flow rate and an expansion ratio of the long-chain branch-containing polypropylene is shown in FIG. 2.

Comparative Example 1

The procedure of Example 1 was repeated except that 5.0 parts by weight of PP (B-3) shown in Table 1 was used in place of PP (B-1).

The results are set forth in Table 2. The relation between a melt flow rate and an expansion ratio of the polypropylene having no long-chain branch is shown in FIG. 2.

Comparative Example 2

The procedure of Example 1 was repeated except that 5.0 parts by weight of PP (B-4) shown in Table 1 was used in place of PP (B-1).

The results are set forth in Table 2. The relation between a melt flow rate and an expansion ratio of the polypropylene having no long-chain branch is shown in FIG. 2.

Comparative Example 3

The procedure of Example 1 was repeated except that 5.0 parts by weight of PP (B-5) shown in Table 1 was used in place of PP (B-1).

The results are set forth in Table 2. The relation between a melt flow rate and an expansion ratio of the polypropylene having no long-chain branch is shown in Table 2.

TABLE 2

| | Example 1 | Example 2 | Comp. Ex. 1 | Comp. Ex. 2 | Comp. Ex. 3 |
|---|---|---|---|---|---|
| Formulation (pt(s) by wt) | | | | | |
| Thermoplastic elastomer composition | (A-1) | (A-1) | (A-1) | (A-1) | (A-1) |
| EPDM (a) | 75 | 75 | 75 | 75 | 75 |
| PP-10 (b) | 25 | 25 | 25 | 25 | 25 |
| IIR (c) | 30 | 30 | 30 | 30 | 30 |
| Oil (d) | 50 | 50 | 50 | 50 | 50 |
| Polypropylene | | | | | |
| PP (B-1) | 5 | — | — | — | — |
| PP (B-2) | — | 5 | — | — | — |
| PP (B-3) | — | — | 5 | — | — |
| PP (B-4) | — | — | — | 5 | — |
| PP (B-5) | — | — | — | — | 5 |
| Foaming agent | | | | | |
| Citric acid-NaHCO$_3$ (C-1) | 3 | 3 | 3 | 3 | 3 |
| Evaluation results | | | | | |
| Expansion ratio | 3.2 | 2.5 | 2.0 | 1.5 | 1.3 |

TABLE 2-continued

| | Example 1 | Example 2 | Comp. Ex. 1 | Comp. Ex. 2 | Comp. Ex. 3 |
|---|---|---|---|---|---|
| Surface texture | 4 | 4 | 3 | 3 | 3 |
| Touch | 5 | 5 | 4 | 3 | 2 |
| Uniformity of bubbles | A | A | B | B | B |

Remarks: The amounts of polypropylene and foaming agent are based on 100 parts by weight of thermoplastic elastomer composition.

Example 3

The procedure of Example 1 was repeated except that the amount of PP (B-1) was varied to 15 parts by weight.

The results are set forth in Table 3.

Example 4

The procedure of Example 1 was repeated except that the amount of PP (B-1) was varied to 1.5 parts by weight.

The results are set forth in Table 3.

Example 5

The procedure of Example 1 was repeated except that the amounts of EPDM (a), PP-10 (b) and IIR (c) were varied to 85 parts by weight, 15 parts by weight and 0 part by weight, respectively. The partially crosslinked thermoplastic elastomer composition (A-2) obtained above had a gel content of 49%.

The results are set forth in Table 3.

Example 6

The procedure of Example 1 was repeated except that 75 parts by weight of an ethylene/propylene copolymer rubber having an ethylene content of 72% by mol and a Mooney viscosity [ML$_{1+4}$ (100° C.)] of 80 (hereinafter referred to as "EPM (a)") was used in place of EPDM (a). The partially crosslinked thermoplastic elastomer composition (A-3) obtained above had a gel content of 36%.

The results are set forth in Table 3.

Example 7

The procedure of Example 1 was repeated except that 3.0 parts by weight of azodicarbonamide (C-2) was used in place of the foaming agent (C-1).

The results are set forth in Table 3.

Comparative Example 4

The procedure of Example 1 was repeated except that PP (B-1) was not used.

The results are set forth in Table 3.

Comparative Example 5

The procedure of Example 1 was repeated except that the amount of PP (B-1) was varied to 30 parts by weight.

The results are set forth in Table 3.

Comparative Example 6

The procedure of Example 1 was repeated except that 5 parts by weight of PP (B-1) was added to the mixture prior to the dynamic heat treatment in the preparation of the partially crosslinked thermoplastic elastomer composition (A-1) and PP (B-1) was not used after the preparation of the thermoplastic elastomer composition. The partially crosslinked thermoplastic elastomer composition (A-4) obtained above had a gel content of 32%.

The results are set forth in Table 3.

TABLE 3 (I)

|  | Example 3 | Example 4 | Example 5 | Example 6 |
|---|---|---|---|---|
| Formulation (pt(s) by wt) | | | | |
| Thermoplastic elastomer composition | (A-1) | (A-1) | (A-2) | (A-3) |
| EPDM (a) | 75 | 75 | 85 | — |
| EPM (a) | — | — | — | 75 |
| PP-10 (b) | 25 | 25 | 15 | 25 |
| IIR (c) | 30 | 30 | — | 30 |
| Oil (d) | 50 | 50 | 50 | 50 |
| PP (B-1) Polypropylene | — | — | — | — |
| PP (B-1) Foaming agent | 1.5 | 1.5 | 5 | 5 |
| Citric acid-NaHCO$_3$ (C-1) | 3 | 3 | 3 | 3 |
| Azodicarbonamide (C-2) | — | — | — | — |
| Evaluation results | | | | |
| Expansion ratio | 3.6 | 2.2 | 2.3 | 2.4 |
| Surface texture | 4 | 4 | 4 | 4 |
| Touch | 4 | 4 | 4 | 4 |
| Uniformity of bubbles | B | A | A | A |

Remarks: The amounts of polypropylene and foaming agent are based on 100 parts by weight of the thermoplastic elastomer composition.

TABLE 3 (II)

|  | Example 7 | Comp. Ex. 4 | Comp. Ex. 5 | Comp. Ex. 6 |
|---|---|---|---|---|
| Formulation (pt(s) by wt) | | | | |
| Thermoplastic elastomer composition | (A-1) | (A-1) | (A-1) | (A-4) |
| EPDM (a) | 75 | 75 | 75 | 75 |
| EPM (a) | — | — | — | — |
| PP-10 (b) | 25 | 25 | 25 | 25 |
| IIR (c) | 30 | 30 | 30 | 30 |
| Oil (d) | 50 | 50 | 50 | 50 |
| PP (B-1) Polypropylene | — | — | — | 5 |
| PP (B-1) Foaming agent | 5 | — | 30 | — |
| Citric acid-NaHCO$_3$ (C-1) | — | 3 | 3 | 3 |
| Azodicarbonamide (C-2) | 3 | — | — | — |
| Evaluation results | | | | |
| Expansion ratio | 2.1 | 1.3 | 3.2 | 1.5 |
| Surface texture | 3 | 1 | 3 | 2 |
| Touch | 3 | 5 | 1 | 4 |
| Uniformity of bubbles | A | C | D | C |

Remarks: The amounts of polypropylene and foaming agent are based on 100 parts by weight of the thermoplastic elastomer composition.

What is claimed is:

1. A foamable olefin thermoplastic elastomer composition comprising:

[I] 83 to 99 parts by weight of a partially crosslinked thermoplastic elastomer composition (A) obtained by dynamically heat-treating a mixture in the presence of organic peroxide, said mixture comprising:

60 to 95 parts by weight of a peroxide-crosslinking type olefin copolymer rubber (a) which is an ethylene/α-olefin copolymer rubber comprising ethylene, an α-olefin of 3 to 20 carbon atoms and optionally a nonconjugated diene, and 5 to 40 parts by weight of a peroxide-decomposition type olefin plastic (b) which is an α-olefin homopolymer or copolymer containing 50 to 100% by mol of an α-olefin of 3 to 20 carbon atoms and having a melt flow rate (ASTM D 1238-65T, 230° C., load of 2.16 kg) of 5 to 80 g/110 min, the total amount of said components (a) and (b) being 100 parts by weight,

[II] 1 to 17 parts by weight of long-chain branch-containing polypropylene (B), and

[III] a foaming agent (C), the total amount of said components (A) and (B) being 100 parts by weight.

2. The foamable olefin thermoplastic elastomer composition as claimed in claim 1, wherein the long-chain branch-containing polypropylene (B) has a Z average molecular weight (Mz) of at least $1.0 \times 10^6$, contains a long-chain branched polymer and has a molecular weight distribution (Mz/Mw) of at least 3.0.

3. The foamable olefin thermoplastic elastomer composition as claimed in claim 1, wherein the α-olefin for constituting the ethylene/α-olefin copolymer rubber, which is the peroxide-crosslinking type olefin copolymer rubber (a), is propylene or 1-butene.

4. The foamable olefin thermoplastic elastomer composition as claimed in claim 1, wherein the peroxide-decomposition type olefin plastic (b) is isotactic polypropylene or a propylene/α-olefin copolymer.

5. The foamable olefin thermoplastic elastomer composition as claimed in claim 1, wherein the thermoplastic elastomer composition (A) is a composition having been dynamically heat-treated in the presence of organic peroxide and divinylbenzene so as to be partially crosslinked.

6. The foamable olefin thermoplastic elastomer composition as claimed in claim 1, wherein the foaming agent (C) is an organic or inorganic thermal decomposition type foaming agent.

7. The foamable olefin thermoplastic elastomer composition as claimed in claim 6, wherein the content of the foaming agent (C) is 0.5 to 20 parts by weight based on 100 parts by weight of the total amount of the thermoplastic elastomer composition (A) and the long-chain branch-containing polypropylene (B).

8. An olefin thermoplastic elastomer foamed product obtained by heating the foamable olefin thermoplastic elastomer composition as claimed in any one of claims 1 to 7.

9. The olefin thermoplastic elastomer foamed product as claimed in claim 8, wherein said foamed product has an expansion ratio of not less than 2 times.

* * * * *